United States Patent
Fahrni

(10) Patent No.: US 9,420,233 B2
(45) Date of Patent: Aug. 16, 2016

(54) METHOD AND APPARATUS FOR DYNAMICALLY CONTROLLING A VIDEO SURVEILLANCE SYSTEM

(75) Inventor: Robert Fahrni, Exeter, CA (US)

(73) Assignee: Pelco, Inc., Clovis, CA (US)

( * ) Notice: Subject to any disclaimer, the term of this patent is extended or adjusted under 35 U.S.C. 154(b) by 1353 days.

(21) Appl. No.: 12/055,548

(22) Filed: Mar. 26, 2008

(65) Prior Publication Data

US 2009/0244286 A1    Oct. 1, 2009

(51) Int. Cl.
*H04N 7/18*    (2006.01)
*G08B 13/196*    (2006.01)

(52) U.S. Cl.
CPC .............. *H04N 7/18* (2013.01); *G08B 13/196* (2013.01); *H04N 7/181* (2013.01); *H04N 7/183* (2013.01); *H04N 7/185* (2013.01)

(58) Field of Classification Search
CPC ......... H04N 7/18; H04N 7/181; H04N 7/183; H04N 7/185; G08B 13/196
See application file for complete search history.

(56) References Cited

U.S. PATENT DOCUMENTS

| | | | |
|---|---|---|---|
| 7,746,378 B2 * | 6/2010 | Shu et al. | 348/143 |
| 2003/0028884 A1 * | 2/2003 | Swart et al. | 725/51 |
| 2004/0260589 A1 * | 12/2004 | Varadarajan et al. | 705/8 |
| 2006/0039617 A1 * | 2/2006 | Makai et al. | 382/232 |
| 2006/0078047 A1 * | 4/2006 | Shu et al. | 375/240.01 |
| 2007/0146484 A1 * | 6/2007 | Horton et al. | 348/159 |

* cited by examiner

*Primary Examiner* — Joseph Greene
(74) *Attorney, Agent, or Firm* — Hamilton, Brook, Smith & Reynolds, P.C.

(57) ABSTRACT

A method of dynamically controlling the use of a video analysis program in a video surveillance system having a plurality of video sources connected to a network comprising: providing a video analysis program to the video surveillance system, allowing the video analysis program to be used with a predetermined number of video sources, and allowing the use of the video analysis program to be transferred from one of the plurality of video sources to another of the plurality of video sources provided that the total number of video sources using the video analysis program at one time is less than the predetermined number of video sources.

15 Claims, 4 Drawing Sheets

METHOD AND APPARATUS FOR DYNAMICALLY CONTROLLING A VIDEO SURVEILLANCE SYSTEM

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates generally to surveillance systems and, in particular, to a method and apparatus for dynamically controlling a video surveillance system.

Today's video surveillance systems have started utilizing video analysis software to detect various actions in the video images captured by the cameras, such as directional flow, people counting and numerous other analytics. While these analytics can be useful in detecting various occurrences in the video images, they can be costly to install in each of the camera locations. Complex systems can include hundreds of cameras and hence require a large expenditure to provide the desired analysis capability. Accordingly, there has arisen a need in the industry for efficiently and economically providing the analytic capabilities demanded by today's surveillance systems.

SUMMARY OF THE INVENTION

In accordance with the present invention there is provided a method of dynamically controlling the use of a video analysis program in a video surveillance system having a plurality of video sources connected to a network. The method comprises: providing a video analysis program to the video surveillance system, allowing the video analysis program to be used with a predetermined number of video sources, and allowing the use of the video analysis program to be transferred from one of the plurality of video sources to another of the plurality of video sources provided that the total number of video sources using the video analysis program at one time is less than the predetermined number of video sources.

In another aspect of the present invention there is provided a computer readable medium containing instructions that, when executed by a computer, cause the computer to perform the method described hereinabove.

The present invention provides a licensing control function that allows a user to schedule and reassign video analysis modules to different pieces of video equipment. For example, a user may choose to license a video analysis module, such as directional flow, people counting, missing object, and so forth, by taking ten licenses. The user may then install the software in the system either at one central location or preferably at each equipment site, such as the encoders associated with video cameras at different locations monitored by the video surveillance system. The system may have more than ten encoders, but the user can reassign the use or schedule the use among more than the number of licenses provided that the use at any one time does not exceed the number of licenses, thereby facilitating use and reducing the overall cost of the surveillance system. Other advantages and applications of the present invention will be made apparent by the following detailed description of the preferred embodiment of the invention.

DETAILED DESCRIPTION OF THE INVENTION

Figure 1:
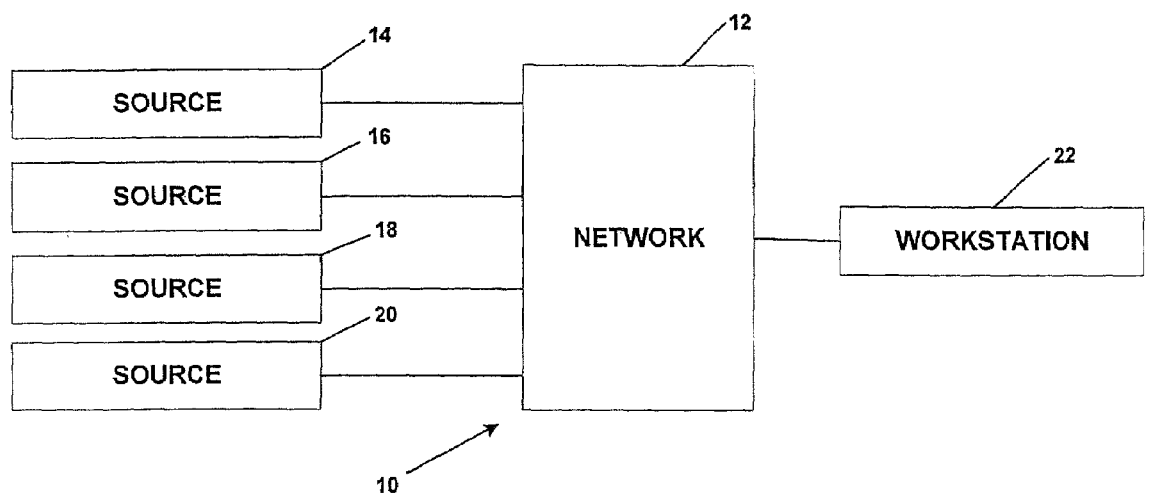
FIG. 1 is a block diagram of a video surveillance system utilizing the present invention.

Referring to FIG. 1, a video surveillance system 10 has a network 12 which can be a closed network, local area network, or wide area network, such as the Internet. A plurality of video sources 14, 16, 18, and 20, which can be, for example, video cameras, digital video recorders or servers, are connected to network 12 to provide real-time video streams, such as MPEG video streams. Workstation 22, which can be, for example, a control point in surveillance system 10, such as a system manager, a personal computer or a user logged into surveillance system 10 by means of a laptop computer, is connected to network 12. Sources 14, 16, 18, and 20 provide MPEG video streams to workstation 22 via network 12.

Figure 2:
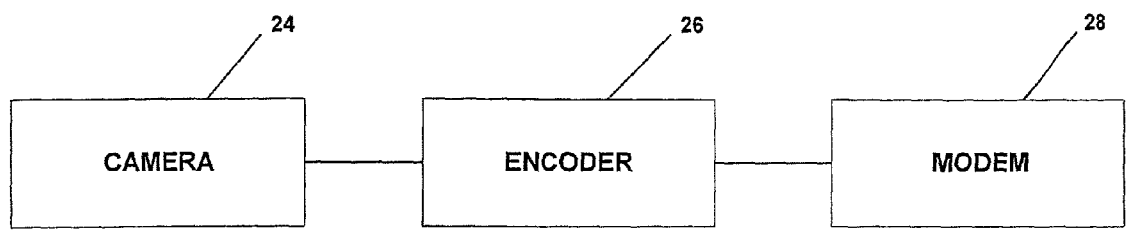
FIG. 2 is a block diagram of an exemplary video source in the video surveillance system shown in FIG. 1.

An exemplary video source is illustrated in FIG. 2 in block diagram form. Camera 24 provides its output to encoder 26, which contains a processor and memory. Encoder 26 provides an MPEG video stream to modem 28 for transmitting to network 12. It is to be understood that although camera 24, encoder 26, and modem 28 have been shown as separate devices, their functions can be provided in a single device or in two devices rather than three separate devices as illustrated.

Figure 3:
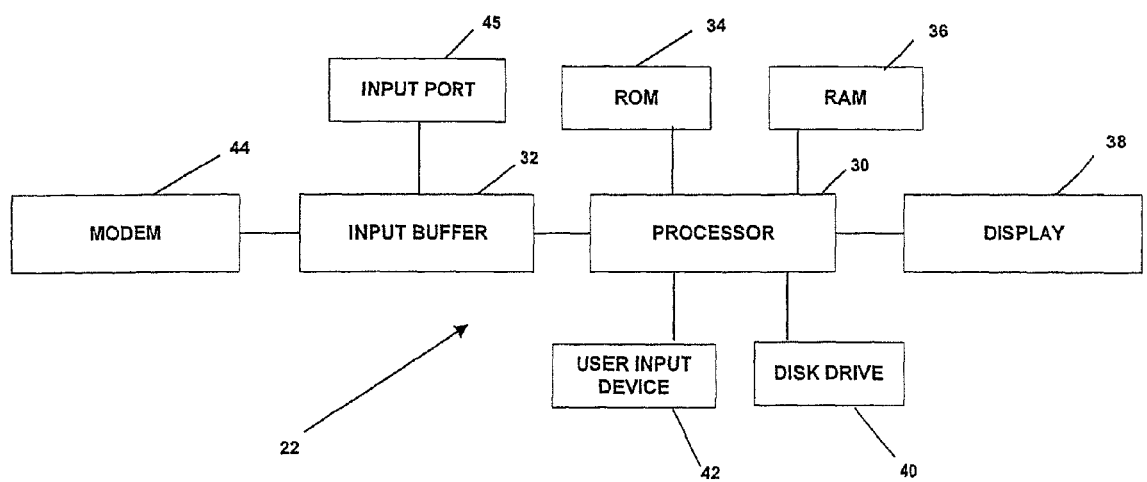
FIG. 3 is a block diagram of an exemplary workstation in the video surveillance system shown in FIG. 1.

With reference to FIG. 3, an exemplary workstation of the present invention is shown in block diagram form. Workstation 22 has a processor 30 which is connected to input buffer 32, ROM 34, RAM 36, display 38, disk drive 40 and user input device 42.

Processor 30 can be a central processing unit or a digital signal processor or both. User input device 42 can be a keyboard, mouse, controller, or other suitable input device. Processor 30 implements algorithms and programs that are stored in ROM 34 or disk drive 40 in response to user input from user input device 42 and provides output signals to display 38. Modem 44 is connected to network 12 and receives the MPEG video streams from sources 14, 16, 18, and 20 in FIG. 1. Modem 44 provides the MPEG video streams to input buffer 32. The video stream data can be stored in a partition of disk drive 40 according to the method of the present invention. Input port 45, which can be, for example, a USB or FireWire port, can also provide video streams to input buffer 32. Alternatively, processor 30 can have its own input buffers, or a portion of RAM 36 can be used as an input buffer.

It should be understood that a computer, as used herein, can have a single processor or multiple processors, which can operate in parallel and/or not in parallel. A computer also refers to two or more computers connected together via a network for transmitting or receiving information between the computers and includes a distributed computer system for processing information via computers linked by a network.

Figure 4:
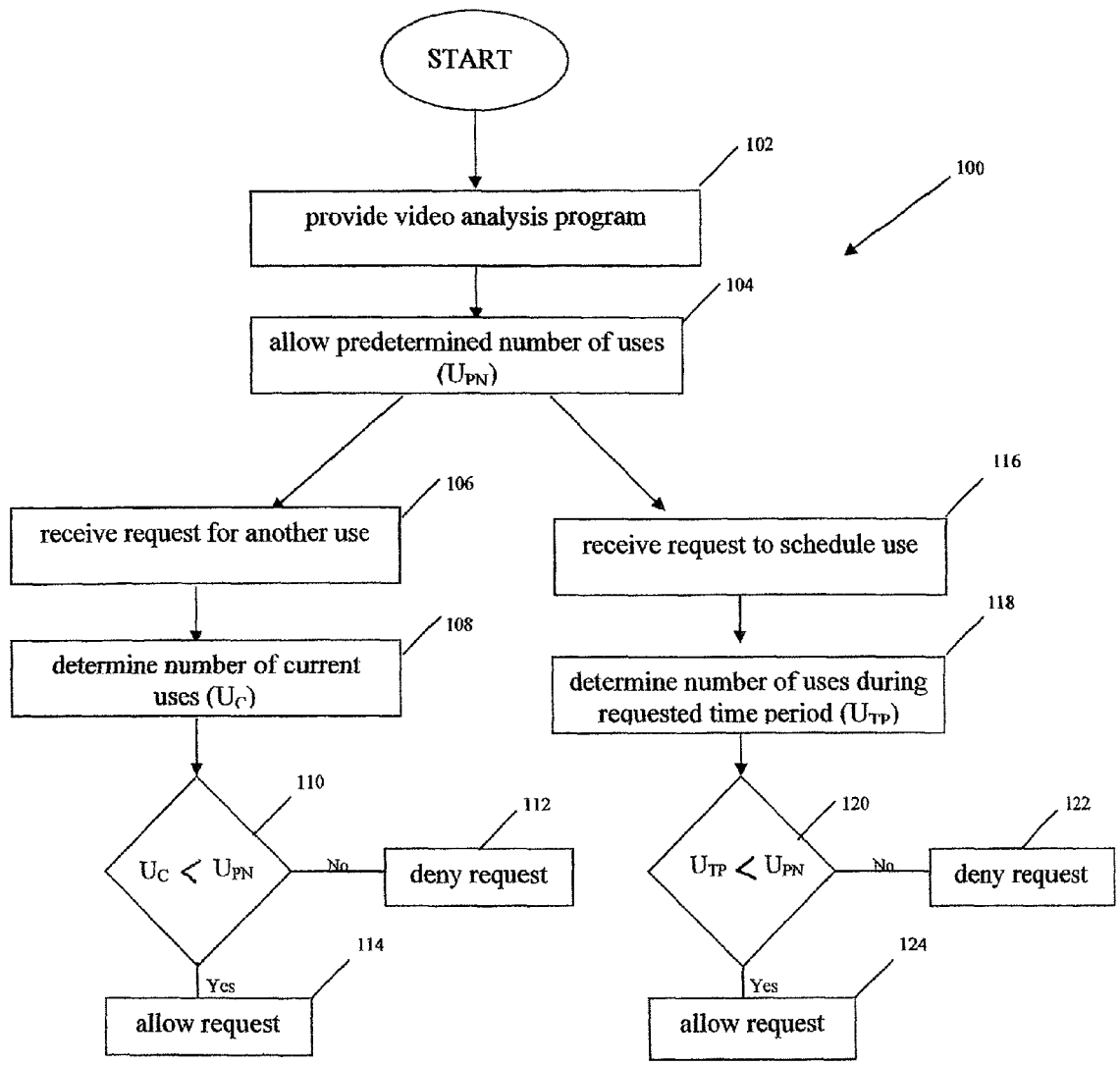
FIG. 4 is a flowchart illustrating one embodiment of the process of the present invention.

FIG. 4 is a flowchart illustrating one embodiment of the process of the present invention. At step 102 of process 100 a video analysis program, such as directional flow, people counting, missing object or other analytic, is provided. Preferably, this step is implemented by storing a copy of the analytic module in each source, i.e., source 14, 16, 18, and 20 in FIG. 1. In the case where the source is a camera, then the analytic module can be stored in encoder 26. Alternatively, the analytic module could be stored at a central location, such as workstation 22, and then downloaded to the appropriate source at run time. It should be noted that, although the discussion refers to a single analytic module, the process of the present invention can be utilized with a plurality of analytic modules. Step 104 is part of the licensing manager function and sets up the allowed number of licenses that can be used in the system. The predetermined number of licenses can be changed later by the user by purchasing additional licenses for the analytic module of interest. For the sake of clarity, process 100 has been split into two branches at step 104, i.e., a first branch starting with step 106 and a second branch starting with step 116. Both processes can be implemented for example in workstation 22.

At step 106 of the first branch, the program receives a request from a user to employ the analytic program at another source in the video surveillance system. Step 108 determines the number of current uses of the analytic, and step 110 determines whether the current number of uses is less than the number of licensed uses. If the current number of uses plus the requested use does not exceed the number of licensed uses, then the request is allowed in step 114. If the current number of uses plus the requested would exceed the number of licensed uses, then the request is denied in step 112.

At step 116 of the second branch, the program receives a request from a user to schedule the use of the analytic program at another source in the video surveillance system at a future time. Step 118 determines the number of current uses of the analytic that are scheduled for use during the time period requested by the user, and step 120 determines whether the scheduled number of uses during the requested time period is less than the number of licensed uses. If the current number of scheduled uses plus the requested use does not exceed the number of licensed uses, then the request is allowed in step 124. If the current number of uses plus the requested would exceed the number of licensed uses, then the request is denied in step 122.

Preferably, the analytics are stored in the encoders associated with the cameras in the system. A software license is taken through a system manager location or workstation to select the analytic module licensed and the number of licenses. The use of the analytic is then assigned by the workstation to a particular encoder and can be reassigned as many times as desired. The use of the analytic can be scheduled on different encoders at different times. At run time, the licensed/assigned encoder tells the workstation what user interface controls are required to configure the analytic, such as by providing a file, which can be an XML file.

The dynamic control program and the video analytic program can be stored separately or together on a computer readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of dynamically enabling the use of a video analysis program in a video surveillance system having a plurality of video sources connected to a network, said method comprising:

enabling a video analysis program, installed in a plurality of video sources in the video surveillance system and stored in an encoder associated with each of the plurality of video sources, to be used with a predetermined number of video sources at one time, the predetermined number being fewer than the plurality;

enabling the use of the video analysis program to be transferred from one of the plurality of video sources to another of the plurality of video sources provided that the total number of video sources using the video analysis program at one time is fewer than the predetermined number of video sources; and enabling a configuration of the video analysis program on at least one of the plurality of video sources using the video analysis program, the configuration enabled via a user interface control received from the at least one of the plurality of video sources using the video analysis program.

2. The method of claim 1 wherein the installed video analysis program is stored in memory associated with each of the plurality of video sources, the memory being accessible to the encoder corresponding thereto.

3. The method of claim 1 wherein enabling the use of the video analysis program to be transferred from one of the plurality of video sources to another of the plurality of video sources comprises:

receiving a request for using the video analysis program with one of the plurality of video sources;

determining the number of video sources using the video analysis program;

comparing the number of video sources using the video analysis program to the predetermined number of video sources; and reassigning the use of the video analysis program from a video source in the plurality of video sources to the video source in the request received if the determined number of video sources using the video analysis program is equal to the predetermined number of video sources.

4. The method of claim 1 wherein the plurality is a first plurality and enabling the use of the video analysis program to be transferred comprises scheduling the use of the video analysis program on a second plurality of video sources at predetermined times.

5. A computer readable medium containing instructions that, when executed by a computer, cause the computer to:

enable a video analysis program, installed in a plurality of video sources in a video surveillance system and stored in an encoder associated with each of the plurality of video sources, to be used with a predetermined number of video sources at one time, the predetermined number being fewer than the plurality;

enable the use of the video analysis program to be transferred from one of the plurality of video sources to another of the plurality of video sources provided that the total number of video sources using the video analysis program at one time is fewer than the predetermined number of video sources; and enable a configuration of the video analysis program on at least one of the plurality of video sources using the video analysis program, the configuration enabled via a user interface control received from the at least one of the plurality of video sources using the video analysis program.

6. The computer readable medium of claim 5 wherein the plurality is a first plurality and enabling the use of the video analysis program to be transferred comprises scheduling the use of the video analysis program on a second plurality of video sources at predetermined times.

7. The computer readable medium of claim 5 wherein the installed video analysis program is stored in memory associated with each of the plurality of video sources, the memory being accessible to the encoder corresponding thereto.

8. The computer readable medium of claim 5 wherein the instructions that enable the use of the video analysis program to be transferred from one of the plurality of video sources to another of the plurality of video source, when executed by a computer, cause the computer to:
receive a request for using the video analysis program with one of the plurality of video sources;
determine the number of video sources using the video analysis program;
compare the number of video sources using the video analysis program to the predetermined number of video sources; and
reassign the use of the video analysis program from a video source in the plurality of video sources to the video source in the request received if the determined number of video sources using the video analysis program is equal to the predetermined number of video sources.

9. The computer readable medium of claim 5 wherein the user interface control is received as an XML file.

10. The method of claim 1 wherein the user interface control is received as an XML file.

11. A computer system for dynamically enabling the use of a video analysis program in a video surveillance system having a plurality of video sources connected to a network, the computer system comprising:
a processor; and
a memory with computer code instructions stored thereon, the processor and the memory, with the computer code instructions, being configured to cause the system to:
enable a video analysis program, installed in a plurality of video sources in the video surveillance system and stored in an encoder associated with each of the plurality of video sources, to be used with a predetermined number of video sources at one time, the predetermined number being fewer than the plurality;
enable the use of the video analysis program to be transferred from one of the plurality of video sources to another of the plurality of video sources provided that the total number of video sources using the video analysis program at one time is fewer than the predetermined number of video sources; and
enable a configuration of the video analysis program on at least one of the plurality of video sources using the video analysis program, the configuration enabled via a user interface control received from the at least one of the plurality of video sources using the video analysis program.

12. The computer system of claim 11 wherein the installed video analysis program is stored in memory associated with each of the plurality of video sources, the memory being accessible to the encoder corresponding thereto.

13. The computer system of claim 11, wherein, in enabling the use of the video analysis program to be transferred from one of the plurality of video sources to another of the plurality of video sources, the processor and the memory, with the computer code instructions, are further configured to cause the system to:
receive a request for using the video analysis program with one of the plurality of video sources;
determine the number of video sources using the video analysis program;
compare the number of video sources using the video analysis program to the predetermined number of video sources; and
reassign the use of the video analysis program from a video source in the plurality of video sources to the video source in the request received if the determined number of video sources using the video analysis program is equal to the predetermined number of video sources.

14. The computer system of claim 11 wherein the plurality is a first plurality and wherein enabling the use of the video analysis program to be transferred comprises scheduling the use of the video analysis program on a second plurality of video sources at predetermined times.

15. The computer system of claim 11 where the user interface control is received as an XML file.

* * * * *